(12) United States Patent  
Boyd et al.

(10) Patent No.: US 9,063,264 B2  
(45) Date of Patent: Jun. 23, 2015

(54) SIMPLIFIED EDGE-LIT BACKLIGHT SYSTEM

(75) Inventors: Gary T. Boyd, Woodbury, MN (US); Qingbing Wang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 752 days.

(21) Appl. No.: 13/148,382

(22) PCT Filed: Feb. 2, 2010

(86) PCT No.: PCT/US2010/022843  
§ 371 (c)(1), (2), (4) Date: Aug. 8, 2011

(87) PCT Pub. No.: WO2010/090996  
PCT Pub. Date: Aug. 12, 2010

(65) Prior Publication Data  
US 2011/0310332 A1 Dec. 22, 2011

Related U.S. Application Data

(60) Provisional application No. 61/151,134, filed on Feb. 9, 2009.

(51) Int. Cl.  
*G02F 1/1335* (2006.01)  
*F21V 8/00* (2006.01)

(52) U.S. Cl.  
CPC .. *G02B 6/0053* (2013.01); *G02F 2001/133607* (2013.01)

(58) Field of Classification Search  
CPC ................. G02F 2001/133607; G02B 5/0053  
USPC ........ 349/62, 64, 65; 362/606–607, 616, 617, 362/620  
See application file for complete search history.

(56) References Cited

U.S. PATENT DOCUMENTS

| 5,175,030 A | 12/1992 | Lu |
| 5,552,907 A | 9/1996 | Yokota |

(Continued)

FOREIGN PATENT DOCUMENTS

| WO | WO 2007/046337 | 4/2007 |
| WO | WO 2009/002853 | 12/2008 |

OTHER PUBLICATIONS

ASTM D-1003-95 "Standard Test Method for Haze and Luminous Transmittance of Transparent Plastics", pp. 197-201, Published Apr. 1995.

(Continued)

*Primary Examiner* — Jessica M Merlin  
(74) *Attorney, Agent, or Firm* — Daniel J. Iden

(57) ABSTRACT

A backlight system includes an extended area light guide (120) and crossed first (128) and second (130) prismatic recycling films. The light guide provides a first light distribution that has a maximum luminance at a first polar angle, e.g., from 70 to 90 degrees, relative to the optical axis (116) of the system. The recycling films provide a second light distribution. No diffuser film is provided between the light guide and the recycling film disposed nearest the light guide. Instead, light is specularly transmitted from the output surface (120a) of the light guide to the input surface (128a) of the recycling film nearest the light guide. The recycling films comprise prisms having refractive indices tailored to provide the second light distribution with a maximum luminance at a polar angle of 10 degrees or less. The prisms preferably have a refractive index from 1.63 to 1.76. Related methods and articles are also disclosed.

16 Claims, 11 Drawing Sheets

(56) References Cited

U.S. PATENT DOCUMENTS

| | | | |
|---|---|---|---|
| 5,771,328 A | 6/1998 | Wortman | |
| 6,151,169 A * | 11/2000 | Kim | 359/640 |
| 6,222,689 B1 | 4/2001 | Higuchi | |
| 6,328,453 B1 | 12/2001 | Ohkawa | |
| 6,354,709 B1 | 3/2002 | Campbell | |
| 6,404,468 B1 * | 6/2002 | Niwano et al. | 349/64 |
| 7,074,463 B2 | 7/2006 | Jones | |
| 2004/0090572 A1 | 5/2004 | Han | |
| 2006/0056166 A1 * | 3/2006 | Yeo et al. | 362/19 |
| 2006/0197888 A1 * | 9/2006 | Huang et al. | 349/64 |
| 2006/0210726 A1 | 9/2006 | Jones | |
| 2007/0052931 A1 * | 3/2007 | Kanatani et al. | 353/69 |
| 2007/0253072 A1 * | 11/2007 | Mullen et al. | 359/641 |
| 2008/0136997 A1 * | 6/2008 | Chang et al. | 349/62 |
| 2008/0225201 A1 * | 9/2008 | Hoshi | 349/62 |
| 2008/0252980 A1 | 10/2008 | Hebrink | |
| 2009/0147179 A1 | 6/2009 | Yamashita | |

OTHER PUBLICATIONS

Search Report of International Application No. PCT/US2010/022843, Date of Mailing May 7, 2010, 4 pages.

U.S. Appl. No. 61/122,706, entitled "High Refractive Index Inorganic Oxide Nanoparticles Comprising Surface Treatment, Polymerizable Resin, and Articles", filed on Dec. 15, 2008.

Written Opinion of International Application No. PCT/US2010/022843, Date of Mailing May 7, 2010, 8 pages.

* cited by examiner

SIMPLIFIED EDGE-LIT BACKLIGHT SYSTEM

CROSS REFERENCE TO RELATED APPLICATIONS

This application is a national stage filing under 35 U.S.C. 371 of PCT/US2010/022843, filed on Feb. 2, 2010, which claims priority to U.S. Provisional Application No. 61/151,134, filed on Feb. 9, 2009, the disclosure of which is incorporated by reference in its/their entirety herein.

FIELD OF THE INVENTION

This invention relates generally to extended area light sources, particularly those suitable for use as backlights for liquid crystal (LC) panels, signs, and the like. The invention is particularly well suited to edge-lit backlights. The invention also relates to components used in backlights, systems that use backlights, and methods of making and using backlights.

BACKGROUND

The number and variety of commercially available display devices have greatly increased in recent years. Computers (whether desktop, laptop, or notebook), personal digital assistants (PDAs), mobile phones, miniature music players, and thin LCD TVs are but a few examples. Although some of these devices can use ordinary ambient light to view the display, most include an extended area light source, referred to as a backlight, to make the display visible.

Many such backlights fall into the categories of "edge-lit" or "direct-lit". These categories differ in the placement of the light sources relative to the output area or face of the backlight, where the output face defines the viewable area of the display device. In edge-lit backlights, a light source is disposed along an outer border of the backlight construction, outside the area or zone corresponding to the output face. The light source typically emits light into a light guide, which has length and width dimensions on the order of the output face and from which light is extracted by extractor features to illuminate the output face. In direct-lit backlights, an array of light sources is disposed directly behind the output face, and a diffuser is placed in front of the light sources to provide a more uniform light output. Some direct-lit backlights also incorporate an edge-mounted light, and are thus capable of both direct-lit and edge-lit operation.

Backlights typically incorporate a variety of light management films to help achieve certain design goals. The design goals may include backlight brightness, efficiency, spatial uniformity over the area of the output face, polarization requirements (e.g. whether polarized light output is necessary or desirable), as well as cost, complexity, size, thickness (thinness), ease of manufacture or assembly, and/or combinations thereof. One key performance metric for liquid crystal display (LCD) backlights is the brightness measured along the direction perpendicular to the plane of the display, referred to as the axial luminance.

Examples of light management films used to achieve these design goals are prism films, diffuser films, polarizing films, mirror films, retarder films, and the like. Many of these film types can be classified further. For example, some prism films, referred to as "turning films", are arranged in edge-lit backlights with prism peaks that are typically oriented toward the light guide. Light exits the light guide and encounters the prism structures. The light is refracted by a first facet of the prism structures and is reflected by a second facet of the prism structures so that it is redirected or "turned" toward the optical axis or viewing axis of the backlight. Another type of prism film "recycles" a portion of the light to increase the amount of on-axis light exiting the display. These prismatic recycling films, also known as brightness enhancement films or "BEF" films, include a prism film layer that has prism peaks that are typically oriented away from the light guide. The prism peaks may be rounded or truncated to achieve particular optical characteristics. As light from the light guide passes through the film and encounters the prisms, a portion of the light is refracted in the on-axis direction, while another portion of the light is reflected by total internal reflection back toward the light guide. The reflected light may be recycled until it eventually emerges from the display.

Many backlights incorporate two prismatic recycling films that are "crossed", i.e., rotated 90 degrees relative to each other, so as to achieve brightness enhancement in two orthogonal viewing planes. At least in the case of edge-lit backlights, a separate diffuser film is also typically included between the light guide and the crossed recycling films. The diffuser film employs scattering elements to help redirect light emitted by the light guide, which is typically highly oblique, into a wider angular range whose maximum luminance is closer to the axial direction. The crossed recycling films then redirect some of this wider angle light back towards the diffuser film and light guide for recycling, and redirect some of the light in a forward direction to enhance the axial luminance. It is standard industry practice to include the diffuser film between the light guide and the crossed recycling films; industry backlight designers consider it necessary to use such a diffuser film in combination with the crossed recycling films to maximize the axial luminance of the backlight.

BRIEF SUMMARY

We have devised a way to avoid the limitations imposed by this common industry practice and knowledge. Thus, we describe herein, among other things, simplified edge-lit backlight designs that use a light guide and crossed prismatic recycling films, but that are able to omit the diffuser film between the light guide and the recycling films while still achieving high axial luminance. The recycling films in these designs preferably utilize prisms whose refractive index is tailored to provide a maximum luminance within a narrow range, e.g. within 10 degrees, of the axial direction. For example, we have found that prism indices in the range from 1.63 to 1.76, or even 1.65 to 1.75, or even 1.67 to 1.73, can be used to provide a maximum luminance within this narrow range of the axial direction for a variety of different light guide designs. By omitting the diffuser film, the backlight can be made significantly thinner, allowing extra space for additional features, reducing weight, and/or reducing the display form factor. Also, the reduced bill of materials for the backlight can reduce system cost and/or simplify backlight assembly procedures.

We also describe a backlight system having an optical axis, the system including an extended area light guide, one or more light sources, and a first and second prismatic recycling film. The light guide has an output surface and a side surface, and the light source(s) is/are disposed to emit light into the light guide through the side surface. The light guide provides a first light distribution from the output surface thereof, the first light distribution having a maximum luminance at a first polar angle relative to the optical axis, for example, of at least 60 degrees, or at least 70 degrees. The first and second recycling films each have an input surface and an output surface, and the first recycling film is disposed between the second recycling film and the light guide, i.e., closer to the light guide than is the second recycling film. The first and second recycling films are also rotated azimuthally with respect to each other in a substantially crossed orientation, providing a second light distribution from the output surface of the second recycling film. Light is specularly transmitted from the output surface of the light guide to the input surface of first recycling film. For example, the system may include no diffuser film between the output surface of the light guide and the input surface of the first recycling film, and/or the output surface of the light guide is adjacent the input surface of the first recycling film, and/or the output surface of the light guide contacts the input surface of the first recycling film, and/or light travels only through air when propagating from the output surface of the light guide to the input surface of the first recycling film. The first prismatic recycling film comprises first prisms and the second prismatic recycling film comprises second prisms, the first and second prisms having refractive indices tailored to provide the second light distribution with a maximum luminance at a second polar angle relative to the optical axis, the second polar angle being no more than 10 degrees.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

Figure 1:
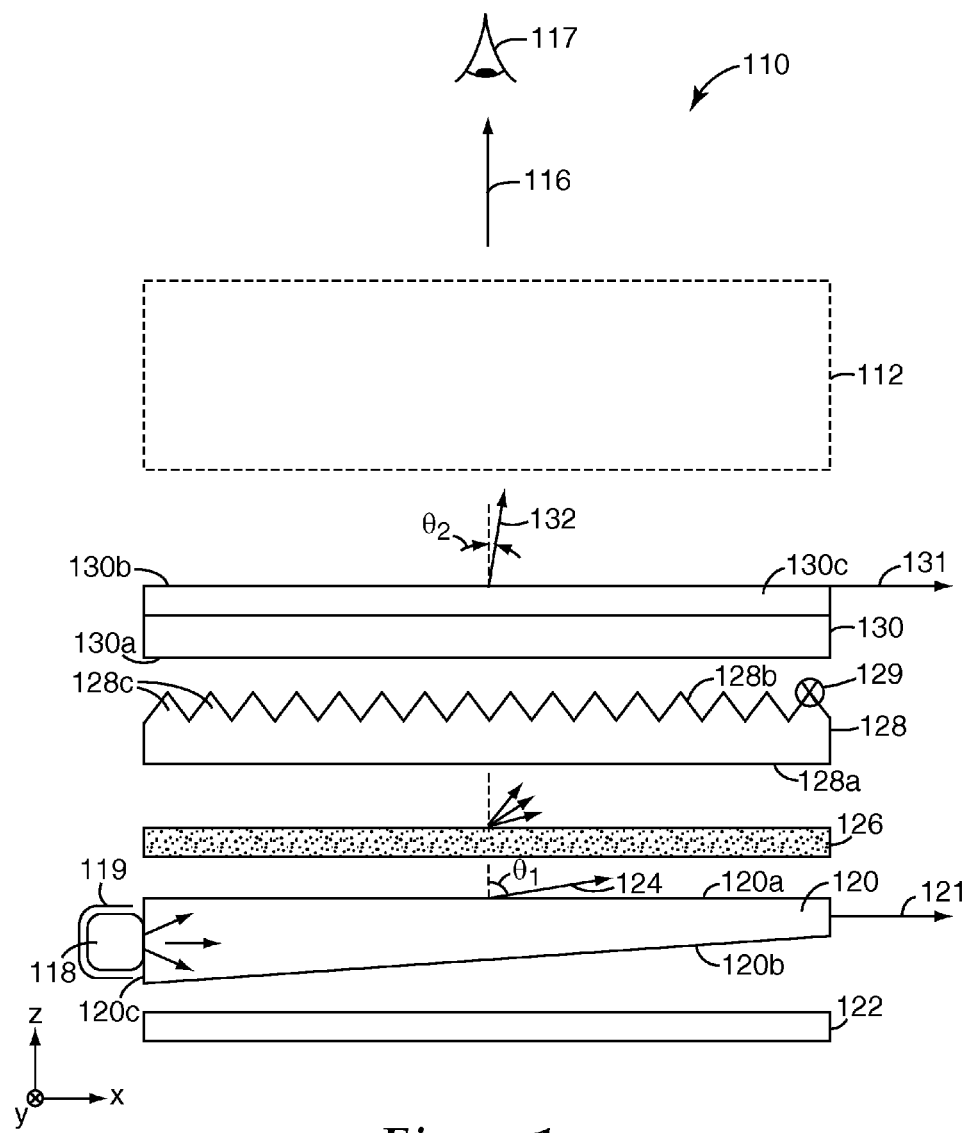
FIG. 1 is a schematic side view of a display comprising a backlight assembly.

FIG. 1 depicts a schematic side view of a display system 110 that includes a display device 112 illuminated from behind by a backlight system 114. The system 110 is shown in the context of a Cartesian x-y-z coordinate system, where the z-axis substantially corresponds to an optical axis 116 of the display device and the backlight. An observer 117 is positioned to view the display head-on, i.e., along the optical axis 116. The display device 112, which is shown only generically by a box in the figure, typically comprises a liquid crystal display (LCD) panel sandwiched between a front and rear absorbing polarizer, the LCD panel having a multitude of electronically addressable picture elements (pixels) to enable electronically addressable images. However, in some embodiments the display device may be of a simpler design and may not comprise an LCD panel. For example, the display device may be or comprise a light-transmissive film or other substrate on which is printed a static image.

Of more interest to the present application is the backlight system 114. The system 114 includes an active light source 118 disposed near an edge or side of a solid light guide 120. A reflector 119 may be used behind the light source 118 to increase the amount of light coupled into the light guide and reduce losses.

The light source 118 is considered to be "active" because it converts energy of one type, typically electrical energy, into visible light energy, although light in other wavelength ranges such as the ultraviolet or infrared may also be generated. Cold cathode fluorescent lamps (CCFLs) and light emitting diodes (LEDs) are exemplary active light sources, but other suitable light sources can also be used. Since most backlight systems are made for use with full-color displays intended for human viewing, the light source 118 preferably emits "white light", i.e., light that is perceived as white by a human observer, although monochrome displays are also contemplated. Note that in some cases the light source may emit light at discrete colors which, when combined, is perceived as white. The combination of one or more red-, green-, and blue-emitting LEDs may thus be used as the light source 118.

The light guide 120 can be of any conventional design, but is shown for simplicity as having the illustrated front and back major surfaces 120a, 120b, and a side surface 120c. The light source 118 emits light into the light guide 120 through the side surface 120c. This light propagates along the light guide generally along an in-plane longitudinal axis 121 by total internal reflection at the surfaces 120a, 120b, but propagation within the light guide also takes place along an orthogonal in-plane axis (the y-axis). Light continues to propagate within the light guide until the angle of incidence of the light on an exiting face of the light guide is less than a critical angle. As long as the angle of incidence of the light within the light guide is greater than the critical angle, the light is totally internally reflected. When the angle of incidence becomes less than the critical angle, the light is transmitted through the front surface 120a, escaping the light guide. For wedgeshaped light guides, where the back surface 120b is angled or tilted relative to the front surface 120a, the incidence angle of the light is reduced by an amount proportional to the wedge angle for each reflection from the front surface 120a. The light guide is typically designed to emit light over a substantial majority of its front surface 120a. Discrete light extraction features (not shown) are often distributed in a non-uniform pattern on the front surface 120a, on the back surface 120b, or on both surfaces so as to promote relatively uniform luminance over the area of the front surface 120a. In some cases a high reflectivity back reflector 122 may be included to reflect light that escapes through the back surface 120b of the light guide back towards the light guide front surface, or the back reflector may be applied to or coated onto the back surface 120b of the light guide.

Regardless of the exact design details of the light source and the light guide, light is emitted from the front surface of the light guide into the air or other surrounding medium with a particular distribution of luminance as a function of angle, spatially averaged over the front surface, which distribution may be referred to as an "LG (light guide) light distribution". The LG light distribution is a function of direction in air or other surrounding medium, and any direction can be specified completely in 3 dimensions by two angles: a polar angle measured relative to the optical axis 116, and an azimuthal angle measured relative to the x-axis, the y-axis, or any other fixed axis in the x-y plane. One significant characteristic of the LG light distribution is its direction of maximum luminance, which is shown as direction 124 in FIG. 1. The angular coordinates ($\theta,\phi$) of this direction of maximum luminance can be referred to as a peak polar angle and a peak azimuthal angle, respectively, the peak polar angle being labeled $\theta_1$ in FIG. 1. The LG light distribution and the direction of maximum luminance will of course depend to some extent on the design details of the light source and the light guide, but for many practical designs the direction of maximum luminance is highly oblique, such that the peak polar angle $\theta_1$ is at least 60 degrees, or at least 70 degrees, or from 75 to 85 degrees, for example. Depending on the symmetry of the components used and their relative arrangement, the azimuthal component of the direction of maximum luminance may lie in or close to the x-z plane, i.e., the peak azimuthal angle may coincide with or deviate only slightly from the x-axis or the longitudinal axis 121 of the light guide, although in some cases the direction of maximum luminance may lie substantially outside of the x-z plane and thus the peak azimuthal angle may deviate substantially from the x-axis or longitudinal axis 121. The LG light distribution may also be characterized by the angular width of the distribution, e.g., the full angular width in the polar angle at which the luminance falls to half of the maximum luminance, referred to as $\Delta\theta_1$, or the full angular width in the azimuthal angle at which the luminance falls to half of the maximum luminance, referred to as $\Delta\phi_1$. For many practical systems, $\Delta\theta_1$ is in a range from 1 to 20 degrees, and $\Delta\phi_1$ is in a range from 20 to 100 degrees.

In the backlight 114, the highly oblique LG light distribution emitted by the light guide propagates forward to the next optical component, a diffuser film 126. The diffuser film employs scattering elements to help redirect light emitted by the light guide, which as we have seen is typically highly oblique, into a wider angular range whose direction of maximum luminance is closer to the axial direction. The scattering characteristics of the diffuser film 126 also help to blur any spatial nonuniformities resident in the light guide 120 for the benefit of the viewer 117.

The widened light distribution emitted by the diffuser film 126 then propagates forward to a first prismatic recycling film 128, and further to a second prismatic recycling film 130 that may be oriented to be substantially crossed relative to film 128. The recycling films 128, 130 each comprise an input surface (128a, 130a, respectively) and an output surface (128b, 130b, respectively), the input surface in the particular embodiment illustrated being substantially flat and smooth and the output surface being faceted or structured to define a multitude of prisms (128c, 130c, respectively) arranged parallel to each other and to a prism axis (129, 131, respectively). The prisms 128c, 130c may have included angles of nominally 90 degrees at the prism peaks. Prism axis 129 is shown substantially aligned with the y-axis, whereas prism axis 131 is shown substantially aligned with the x-axis. The design of the input surfaces 128a, 130a and the output surfaces 128b, 130b, and other design details of the films such as the refractive index of the prisms 128c, 130c, provide the films 128, 130 with their particular brightness enhancement and light recycling light management properties. As is known generally to those skilled in the art, the recycling films 128, 130 redirect on-axis light incident on their respective input surfaces backward towards the light guide 120. The films 128, 130 also redirect highly off-axis or obliquely incident light on their input surfaces (if incident in the appropriate plane for each film, i.e., the x-z plane for film 128 and the y-z plane for film 130) generally forward towards the display device 112. Such forward-directed rays contribute to the brightness of the backlight 110. Light that is reflected backwards from the films 128, 130 can be recycled by reflective components within the backlight and transformed into an obliquely directed light ray that can then be transmitted by the films 128, 130 towards the display device 112. This recycling process, and the fact that symmetrically designed prisms redirect light from two different directions (both positive and negative angles $\theta$) into a combined axial output beam, contribute to the brightness enhancing properties of the recycling films 128, 130.

The operation of the recycling films 128, 130 on the widened light distribution emitted by the diffuser film 126 results in a modified light distribution exiting the output surface 130b of the top recycling film, which modified light distribution may be referred to as an "RF (recycling film) light distribution". In an analogous fashion to the LG light distribution, the RF light distribution possesses various measurable characteristics, including a direction of maximum luminance which is shown as direction 132 in FIG. 1, and angular widths in the polar and azimuthal directions (full width at half maximum, for example) of $\Delta\theta_2$ and $\Delta\phi_2$ respectively, analogous to $\Delta\theta_1$ and $\Delta\phi_1$ described above. The angular coordinates ($\theta,\phi$) of the direction of maximum luminance 132 can likewise be referred to as a peak polar angle and a peak azimuthal angle, respectively, the peak polar angle being labeled $\theta_2$ in FIG. 1. Proper design of the recycling films ensures that direction 132 is much more closely aligned with the axial direction or optical axis 116 than is the direction 124 from the light guide, and that the polar angle $\theta_2$ is much smaller than $\theta_1$. The angle $\theta_2$ is typically as small as possible, e.g., less than 10, 5, 3, or 2 degrees, or even 1 degree, so as to maximize the key performance metric of axial luminance. This can be achieved in the system of FIG. 1 with commonly available BEF recycling films, whose prismatic output surfaces are characterized by a prism angle of nominally 90 degrees and a refractive index for the prisms of about 1.56 to 1.58.

Figure 1A:
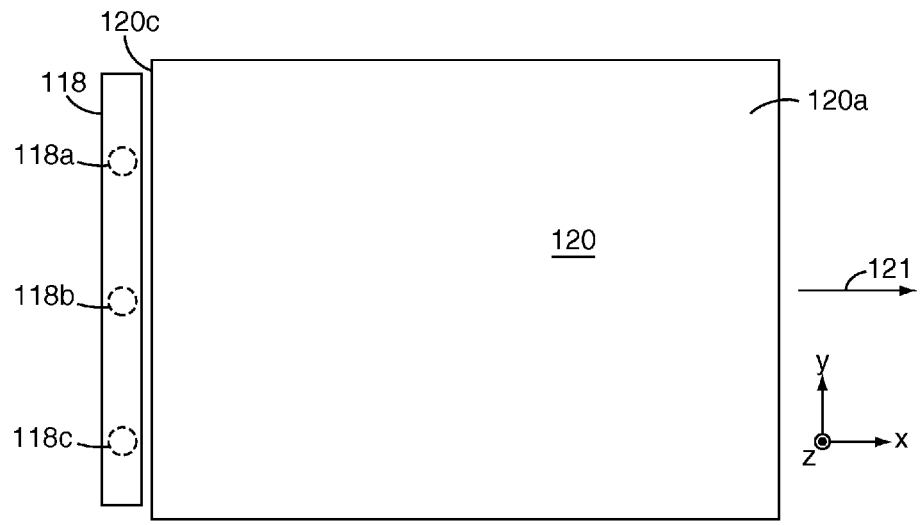
FIG. 1a is a schematic top or front view of the light source and light guide of FIG. 1.
Figure 2:
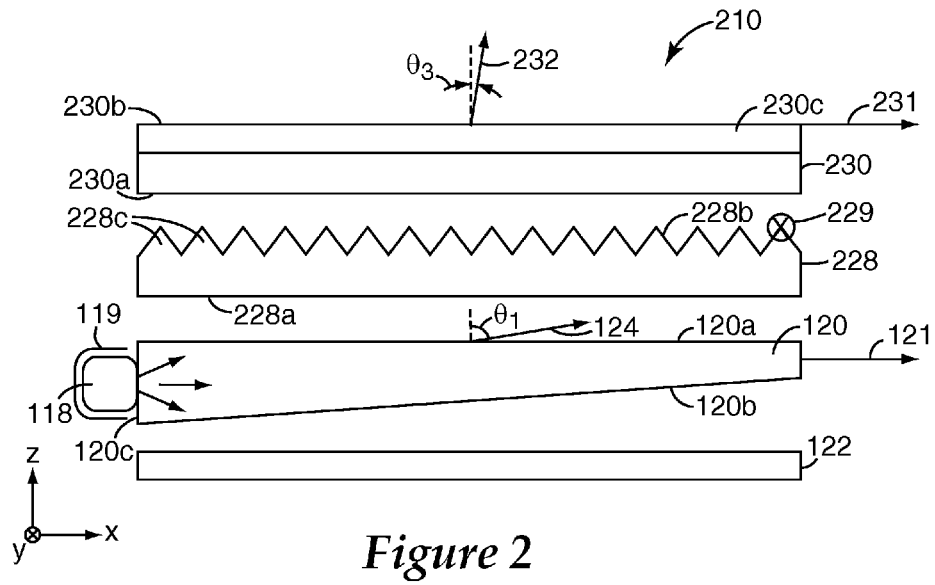
FIG. 2 is schematic side view of a simplified backlight assembly.
Figure 3:
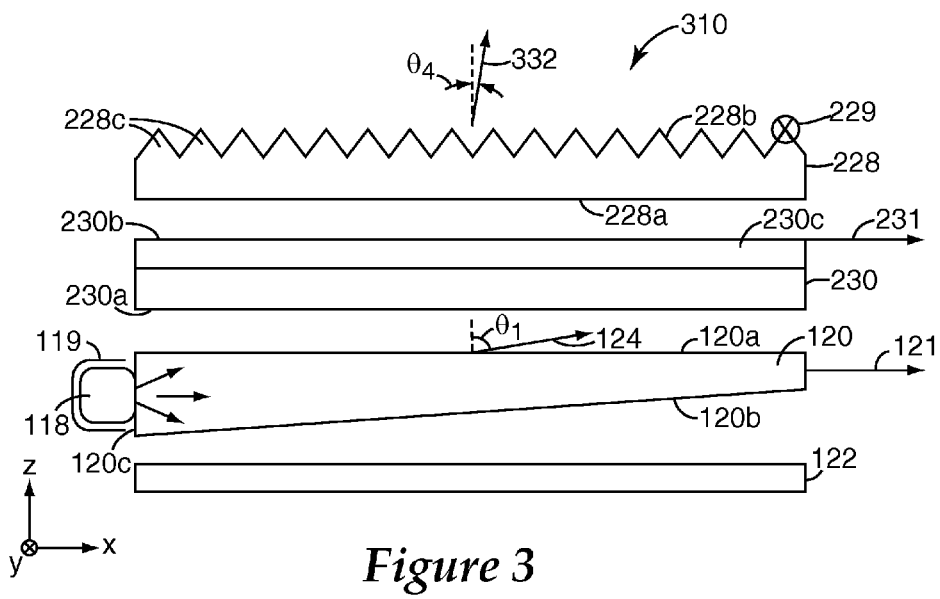
FIG. 3 is a schematic side view of another simplified backlight assembly.

Before turning to the alternative backlight embodiments of FIGS. 2 and 3, features of the light source and its relationship to the light guide can be seen in the schematic top or front view of FIG. 1a, showing in this different view the light guide 120 and light source 118 of FIG. 1. In the view of FIG. 1a, one can see that the light source 118 can have an elongated shape, such as with a CCFL light source, which elongated shape is substantially aligned with the side surface 120c of the light guide, and the light source may cover a substantial majority or substantially all of the length of the side surface, as shown. In an alternative embodiment, the single elongated light source may be replaced with a plurality of discrete light sources 118a, 118b, 118c arranged along the side surface 120c. Such discrete light sources may be or comprise LEDs, for example. In still other embodiments, constraints on the system design may allow for only one discrete light source 118a, 118b, 118c to be used.

FIG. 2 shows a schematic side view of a backlight system 210 that is simplified relative to the backlight 114 of FIG. 1. In this figure, elements or components that may be the same as those of FIG. 1 are provided with the same reference numeral, and are not discussed further in view of their descriptions above. The crossed prismatic recycling films 128, 130 of backlight 114 have been replaced in backlight 210 with crossed prismatic recycling films 228, 230. Also, in contravention to common industry practice and knowledge, the diffuser film 126 has been eliminated.

Thus, in backlight 210, whose optical axis is parallel to the z-axis, the highly oblique LG light distribution emitted by the light guide 120 propagates forward not to a diffuser film, but to a first prismatic recycling film 228, and further to a second prismatic recycling film 230 that may be oriented to be substantially crossed relative to film 228. The recycling films 228, 230 each comprise an input surface (228a, 230a, respectively) and an output surface (228b, 230b, respectively), the input surface in the particular embodiment illustrated being substantially flat and smooth and the output surface being faceted or structured to define a multitude of prisms (228c, 230c, respectively) arranged parallel to each other and to a prism axis (229, 231, respectively). The prisms 228c, 230c may have included angles of nominally 90 degrees at the prism peaks. Prism axis 229 is shown substantially aligned with the y-axis, whereas prism axis 231 is shown substantially aligned with the x-axis. In fact, the recycling films 228, 230 may be substantially the same as recycling films 128, 130, respectively, except that the prisms of films 228, 230 have been specifically tailored to have refractive indices that fall in a narrow range of values that surprisingly allows the output of the simplified backlight 210 to have a maximum luminance closely aligned with the optical axis (the z-axis) of the backlight. In particular, we have found this specific narrow range of refractive index to be from 1.63 to 1.76, or even 1.65 to 1.75, or even 1.67 to 1.73.

Using prism indices in this narrow range, the recycling films 228, 230 are able to directly receive the highly oblique LG light distribution emitted by the light guide 120, and transform that light distribution into a modified light distribution exiting the output surface 230b of the top recycling film, which modified light distribution may again be referred to as an "RF (recycling film) light distribution". The RF light distribution of backlight 210 can be characterized by a direction of maximum luminance which is shown as direction 232 in FIG. 2, and angular widths in the polar and azimuthal directions (full width at half maximum, for example) of $\Delta\theta_2$ and $\Delta\phi_2$ respectively, analogous to $\Delta\theta_1$ and $\Delta\phi_1$ described above. The angular coordinates ($\theta,\phi$) of the direction of maximum luminance 232 can be referred to as a peak polar angle and a peak azimuthal angle, respectively, the peak polar angle being labeled $\theta_3$ in FIG. 2. Significantly, the peak polar angle $\theta_3$ can be made very small, e.g., less than 10, 5, 3, or 2 degrees, or even 1 degree, even in the absence of a separate diffuser film between the light guide and the crossed recycling films, so as to maximize the key performance metric of axial luminance. This can be achieved in the system of FIG. 2 by specially tailoring the prisms to have a refractive index in the narrow range mentioned above.

As discussed above, omitting the diffuser film between the light guide and the prismatic recycling films allows the backlight to be made significantly thinner, allowing extra space for additional features, reducing weight, and/or reducing the display form factor. In some cases, the backlight designer may wish to take advantage of the extra space by adding one or more other components to the backlight, including a component between the light guide and the recycling films. The backlight designer is free to incorporate such additional components into the backlight while still benefiting from the teachings disclosed herein, but it is preferred that any such additional components are compatible with the specular transmission of light from the output surface of the light guide (surface 120a in FIG. 2) to the input surface of the recycling film disposed nearest the light guide (film 228 in FIG. 2, having input surface 228a). Thus, for example, the backlight design may not only omit a diffuser film between the light guide (120) and the nearest prismatic recycling film (228), but it may also omit any other separate optical film or similar component therebetween. In that case, the nearest recycling film (228) may simply rest upon the light guide (120), and the input surface (228a) of such nearest recycling film may substantially contact the output surface (120a) of the light guide. A thin but optically significant air gap may reside between the respective surfaces, such that light travels only through air when propagating from the output surface of the light guide to the input surface of the nearest recycling film. In other embodiments, the backlight designer may choose to include one or more separate optical films between the light guide and the nearest recycling film. In such cases, such separate film(s) preferably introduce relatively little or no scattering or haze, so that specular transmission of light between the surfaces 120a, 228a is maintained. In this regard, specular transmission of light may be considered to refer to light propagation without the degree of scattering typically experienced with diffuser films. For example, depending upon the intended application, the degree of scattering may correspond to a haze value of less than 10%, less than 5%, or less than 1%, for example, where the haze value may be measured using a Hazeguard™ Plus Hazemeter available from BYK-Gardner USA using test methods described in the manual for the instrument. Reference is also made to ASTM standard ASTM D-1003, "Standard Test Method for Haze and Luminous Transmittance of Transparent Plastics", which may be utilized.

We describe above a specific narrow range of refractive index for the prisms of the prismatic recycling films 228, 230, namely, from 1.63 to 1.76, or even 1.65 to 1.75, or even 1.67 to 1.73. Since some optical materials exhibit non-negligible dispersion in certain spectral regions, it may in some cases be helpful to specify the wavelength at which these refractive indices are measured. In cases where the backlight is intended to provide light output at only a specific wavelength or color, as with monochrome display systems, then the refractive indices are measured at such specific wavelength or color. In cases where the backlight is designed to provide white light, a particular wavelength or color may be selected as representative of the visible spectrum, e.g., green light at 550 nm. Alternatively, the refractive index may be an average of the refractive index of the material over the visible spectrum, for example.

In this regard, as a result of material dispersion, wherein for most suitable polymer materials the refractive index increases with decreasing wavelength, the variation of the axial luminance with prism refractive index discussed more fully below may then result in a variation in axial luminance with wavelength. For the region of the optimal range of indices where the luminance increases with refractive index, the axial luminance may be higher at shorter wavelengths, leading to a blue hue, while a reddish hue may result in the range of prism indices where the luminance decreases with refractive index. As a result, it may be desirable to operate in a range of prism refractive index where axial luminance varies the least with index.

A variety of materials, both those that are now known and those that may be later developed, can be used to form the prisms in the specific narrow refractive index range. Preferably, the materials have a low absorption over the wavelength range of interest. Also, the materials are preferably ones that are compatible with casting-and-curing, embossing, extruding, and/or other fabrication techniques suitable for forming microstructured surfaces. Exemplary materials are polymeric, but may also include additives whose composition and concentration are tailored to provide the appropriate refractive index. For example, any of the polymer materials incorporating a plurality of inorganic nanoparticles (e.g., surface-modified colloidal nanoparticles of silica, zirconia, or mixtures thereof) disclosed in U.S. Pat. No. 7,074,463 (Jones et al.) or US 2006/0210726 (Jones et al.), and other compositions disclosed therein, may be used.

FIG. 3 shows a schematic side view of another simplified backlight system 310 that is that is similar to the simplified backlight 210 of FIG. 2, except that the order of the recycling films 228, 230 has been reversed. Again, elements or components that may be the same as those of FIG. 1 or 2 are provided with the same reference numeral, and are not discussed further in view of their descriptions above. The crossed prismatic recycling films 228, 230 of backlight 210 have been reversed in backlight 310, such that film 230, with its prism axis 231 parallel to the x-axis and to the longitudinal axis 121 of the light guide, is disposed between the other recycling film 228 and the light guide 120. Like backlight 210, backlight 310 also omits the diffuser film 126, in contravention to common industry practice and knowledge.

Thus, in backlight 310, whose optical axis is parallel to the z-axis, the highly oblique LG light distribution emitted by the light guide 120 propagates forward not to a diffuser film, but to a first prismatic recycling film 230, and further to a second prismatic recycling film 228 that may be oriented to be substantially crossed relative to film 230. Just as was described in connection with FIG. 2, the prisms of films 228, 230 have been specifically tailored to have refractive indices that fall in a narrow range of values that surprisingly allows the output of the simplified backlight 310 to have a maximum luminance closely aligned with the optical axis (the z-axis) of the backlight. This specific narrow range of refractive index is from 1.63 to 1.76, or even 1.65 to 1.75, or even 1.67 to 1.73.

Using prism indices in this narrow range, the recycling films 228, 230 are able to directly receive the highly oblique LG light distribution emitted by the light guide 120, and transform that light distribution into a modified light distribution exiting the output surface 228b of the top recycling film, which modified light distribution may again be referred to as an "RF (recycling film) light distribution". The RF light distribution of backlight 310 can be characterized by a direction of maximum luminance which is shown as direction 332 in FIG. 3, and angular widths in the polar and azimuthal directions (full width at half maximum, for example) of $\Delta\theta_3$ and $\Delta\phi_3$ respectively, analogous to $\Delta\theta_1$ and $\Delta\phi_1$ described above. The angular coordinates $(\theta,\phi)$ of the direction of maximum luminance 332 can be referred to as a peak polar angle and a peak azimuthal angle, respectively, the peak polar angle being labeled $\theta_4$ in FIG. 3. Significantly, the peak polar angle $\theta_4$ can be made very small, e.g., less than 10, 5, 3, or 2 degrees, or even 1 degree, even in the absence of a separate diffuser film between the light guide and the crossed recycling films, so as to maximize the key performance metric of axial luminance. This can be achieved in the system of FIG. 3 by specially tailoring the prisms to have a refractive index in the narrow range mentioned above.

We have found unexpectedly that the recycling film orientation of FIG. 3 can be advantageous relative to the recycling film orientation of FIG. 2 for purposes of improving spatial uniformity of the backlight when discrete light sources are used as the light source for the light guide. Thus, if a row of discrete light sources is used along the edge or side 120c of the light guide, then orienting the prism axis of the bottom recycling film (230 in FIG. 3) to be perpendicular to such row of light sources, rather than orienting the prism axis of the bottom recycling film (228 in FIG. 2) to be parallel to such row of light sources, results in improved spatial uniformity of the backlight.

Many different types of prismatic recycling films (brightness enhancement films) have been described, sold, or otherwise disclosed over the years. In some, the prism height differs from one prism to the next in a repeating pattern. In some, the prism height of each prism varies along the prism axis. In some cases, the prismatic film has a unitary construction, wherein a prism portion and a base or substrate portion are unitary with no detectable interface therebetween, as when the prism film is formed by simply embossing the prism facets into one side of an otherwise flat unitary film. In other cases the prismatic film has a composite construction, wherein the prism portion is formed of a first material and the base portion is formed of a different second material such that an interface is detectable therebetween, as when the prisms are formed from a curable material that is cast and cured on one surface of a flat base film composed of a different material. The reader's attention is directed to U.S. Pat. No. 5,175,030 (Lu et al.), U.S. Pat. No. 5,552,907 (Yokata et al.), U.S. Pat. No. 5,771,328 (Wortman et al.), and U.S. Pat. No. 6,354,709 (Campbell et al.), all incorporated herein by reference.

Figure 4:
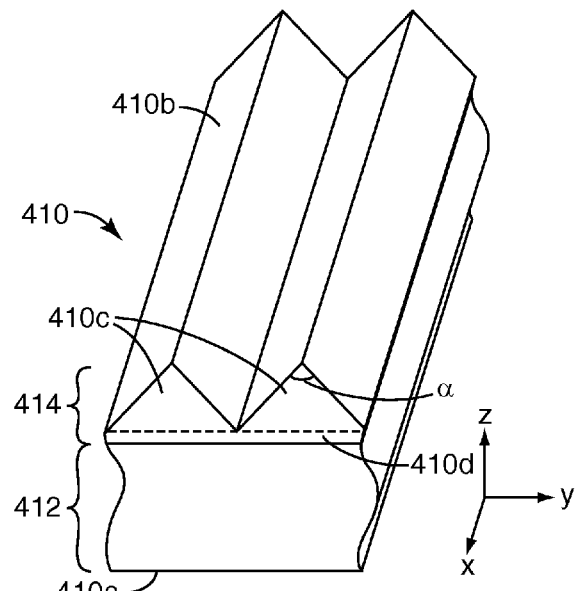
FIG. 4 is a perspective view of an exemplary prismatic recycling film.

An exemplary prismatic recycling film 410 having a composite construction, and suitable for use in the simplified backlight designs discussed herein, is shown in the perspective view of FIG. 4. The film 410 comprises or consists essentially of two layers 412, 414, of which one (412) may be a substantially flat film and the other (414) may be patterned or microstructured with facets that define a multitude of prisms 410c. One major surface 410a of the film 410, which may be an input surface, is associated with one layer 412, while another major surface 410b, which is faceted to define the prisms and which may be an output surface, is associated with the other layer 414. During manufacture, a curable resin may be deposited on the layer or film 412, and after molding and curing, the (now cured) resin becomes the microstructured layer 414. Depending on details of manufacture, the prisms 410c may be connected to each other by a continuous land layer 410d of the same prism material, or they may be unconnected except through the base film (layer 412). The prism angle α is desirably approximately 90 degrees, but deviations therefrom are possible, for example, up to ±10 degrees, or up to ±5 degrees, or up to ±1 degree or less, depending on the intended application.

In cases such as that of FIG. 4, where the prismatic recycling film comprises two or more distinct components that are connected together, the refractive index guidelines discussed above for the prisms pertain to the portion of the film containing the prisms, and do not necessarily present limitations on other portions of the film. Thus, for example, in the film 410 of FIG. 4, the layer 414, which contains the prisms 410c, advantageously has a refractive index from 1.63 to 1.76, or from 1.65 to 1.75, or from 1.67 to 1.73, but the layer 412 need not have such a refractive index. The layer 412 may have any suitable refractive index, inside or outside the 1.63 to 1.76 range as desired, and the film 410 will still be suitable for use in the simplified backlight embodiments of FIGS. 2 and 3.

Before discussing the modeling results of FIGS. 5a-g and 6a-g, we pause here to describe various design features that may be advantageously incorporated into the disclosed backlights or components thereof. We described above improvements in spatial uniformity that may be obtained when the prism direction of the bottom recycling film is perpendicular to a row of discrete light sources. Spatial uniformity can also be increased by adding a matte coating to the bottom surface of the top prism film, i.e., surface 230a in FIG. 2 and surface 228a in FIG. 3. These two effects can combine to at least partially compensate for the defect hiding characteristics of the (omitted) diffuser film.

Various methods exist to manufacture prism films, including extrusion of the prisms, embossing, and cast and cure methods on a polymer substrate. The latter method can utilize transparent films which act as a window for the incident and reflected light, or may be a reflective polarizer, which further enhances the axial brightness utilizing polarization recycling. The lower, nominally smooth surface in all these cases may be patterned with some degree of surface roughness or coated with a bulk diffusive coating to provide optical diffusion for improved illumination uniformity. Crossed prismatic recycling films may be loosely stacked or adhered to one another using a thin adhesive, whose thickness is much less than the prism height. The azimuthal orientation of the "crossed" recycling films may be different from 90 degrees, e.g., it may be chosen to further optimize the angular distribution of light, or reduce undesirable optical artifacts.

In summary, backlight systems comprising a planar light source and crossed prismatic recycling films can be used to eliminate the need for a diffuser film, when the prism refractive indices are between 1.63 and 1.76, inclusive. It is especially advantageous if one of the prism films has a diffusive lower surface, preferably the film farthest from the planar light source.

We turn now to FIGS. 5a-g and 6a-g, which relate to backlight systems that have been computationally modeled to confirm the results reported herein. FIGS. 5a-g relate to backlight systems built around a first extended area light guide whose output light distribution has a maximum luminance at a polar angle of $\theta \approx 80$ degrees. FIGS. 6a-g relate to backlight systems built around a second extended area light guide whose output light distribution has a maximum luminance at a polar angle of $\theta \approx 76$ degrees. The output light distribution of the second light guide is also wider in the polar and azimuthal directions compared to the first light guide. We investigate computationally the effect of changing the prism refractive index in backlights that combine crossed prismatic recycling films, but no diffuser film, with the first light guide, and in backlights that combined the crossed prismatic recycling films (but no diffuser film) with the second light guide. The results for in both cases point to the same desirable refractive index range, i.e., from 1.63 to 1.76, or from 1.65 to 1.75, or from 1.67 to 1.73.

Figure 5A:
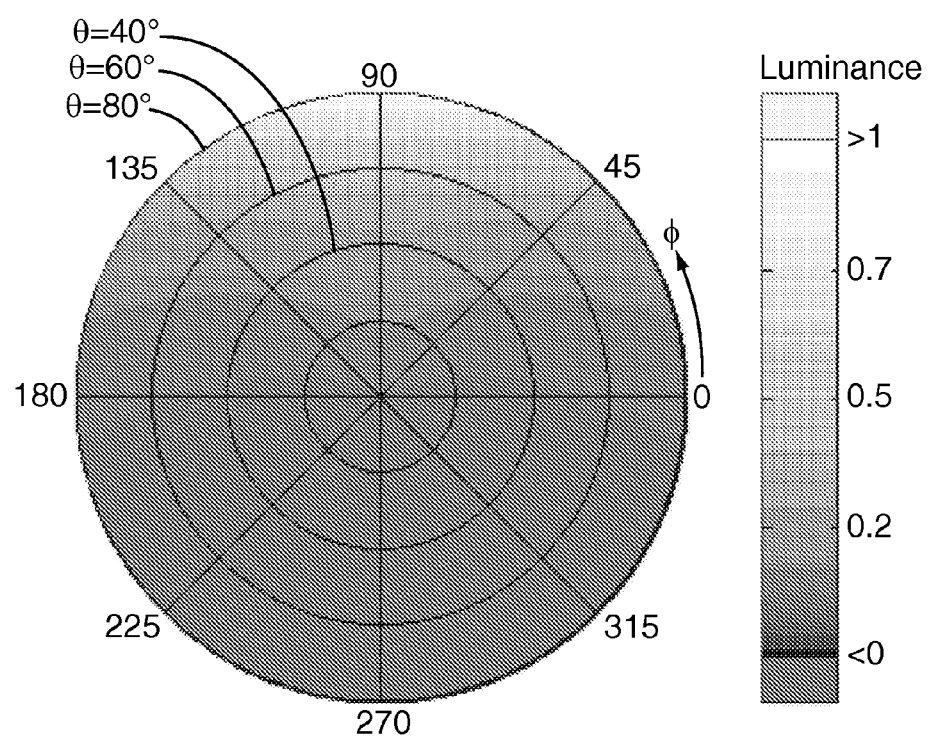
FIG. 5a is a conoscopic image of a calculated light distribution provided by a first light guide, the conoscopic image covering an azimuthal angular range from φ=0 to 360 degrees, and a polar angular range from θ=0 to 80 degrees.

FIG. 5a is a grayscale conoscopic image of the computed luminance of the first modeled light guide with no other optical components. The grid overlaying the image is provided for reference purposes to show the azimuthal angle $\phi$ ranging from 0 to 360 degrees (where $\phi=90$ degrees corresponds to the longitudinal axis of the light guide, e.g., axis 121 in FIGS. 1-3), and the polar angle $\theta$ ranging from 0 at the center to 80 degrees at the periphery, with concentric circles provided for each 20 degree increment of $\theta$. The luminance scale to the right of the image establishes a correspondence of relative luminance to the level or shade of grayness in the image. Thus, the image of FIG. 5a depicts a light distribution analogous to, for example, the light distribution emitted from light guide 120 of FIGS. 1-3. The image confirms the highly oblique nature of the light emitted from the light guide. As mentioned above, the direction of maximum luminance for this first light guide has a polar angle of $\theta \approx 80$ degrees, and a azimuthal angle $\phi$ of about 90 degrees.

Using this first modeled light guide, we now add a pair of crossed prismatic recycling films such as any of those depicted in FIGS. 1-3. The prisms of both films are assumed to have included angles of 90 degrees, and the prism refractive index is 1.56. We include no diffuser film between the crossed recycling films and the first light guide. We then calculate the light distribution exiting the top recycling film, and plot the result in FIG. 5b. For clarity, we also plot the luminance of the light distribution of FIG. 5b along the plane defined by $\phi=90$ degrees (scanning along the vertical direction of the conoscopic diagram), showing the result in the graph of FIG. 5c. As is evident from the plot, the luminance peak is far from the axial direction (polar angle=0) for this backlight design.

We next replace the crossed recycling films having prism index 1.56 with an identical set of crossed recycling films, but where the prism refractive index is now set to 1.68. We again calculate the light distribution exiting the top recycling film, and plot the result in FIG. 5d. For clarity, we also plot the luminance of the light distribution of FIG. 5d along the plane defined by $\phi=90$ degrees (scanning along the vertical direction of the conoscopic diagram), showing the result in the graph of FIG. 5e. As is evident from the plot, the luminance peak is now much closer to the axial direction for this backlight design, and the maximum luminance is also brighter due to an increase in light concentration.

We next repeat this exercise using the same first light guide and the same set of crossed recycling films, but we change the prism index over a range of values and record the axial luminance (calculated luminance at $\theta=0$) and peak polar angle of the light distribution exiting the top recycling film. The results are plotted in FIGS. 5f and 5g. It is evident that in order for the peak brightness of the backlight to be no more than 10 degrees from the axial direction ($\theta=0$), the prism refractive index should be greater than 1.63. Beyond a prism refractive index of 1.76, the maximum luminance drops considerably, and the peak brightness shifts to the opposite side of the axial direction. A bold double-arrow line is provided in both FIGS. 5f and 5g to depict the preferred refractive index range.

Figure 6A:
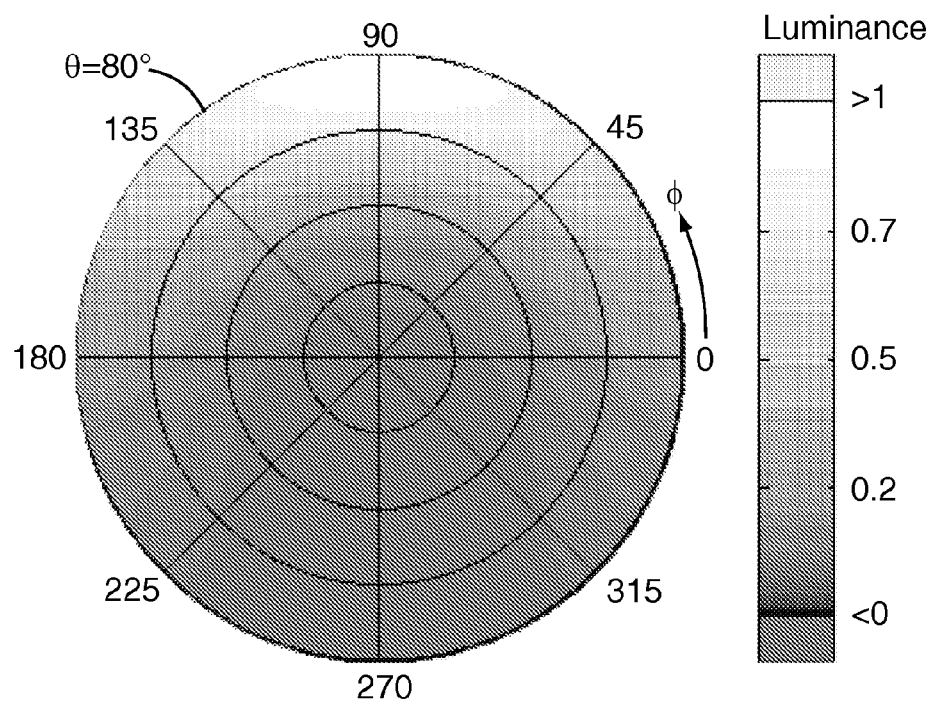
FIG. 6a is a conoscopic image of a calculated light distribution similar to that of FIG. 5a, but for a second light guide that provides a less oblique light output than the first light guide.
Figure 6B:
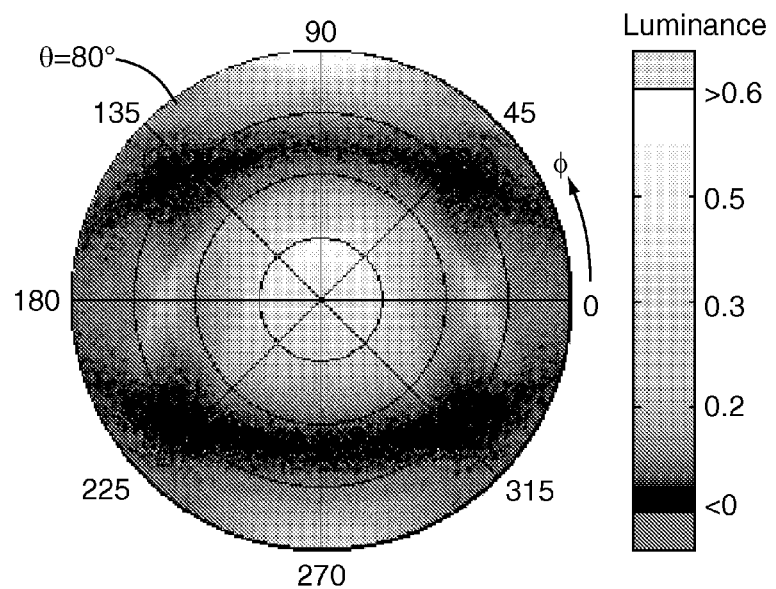
FIGS. 6b-6g correspond respectively to FIGS. 5b-g, but where the first light guide is replaced by the second light guide.
Figure 6C:
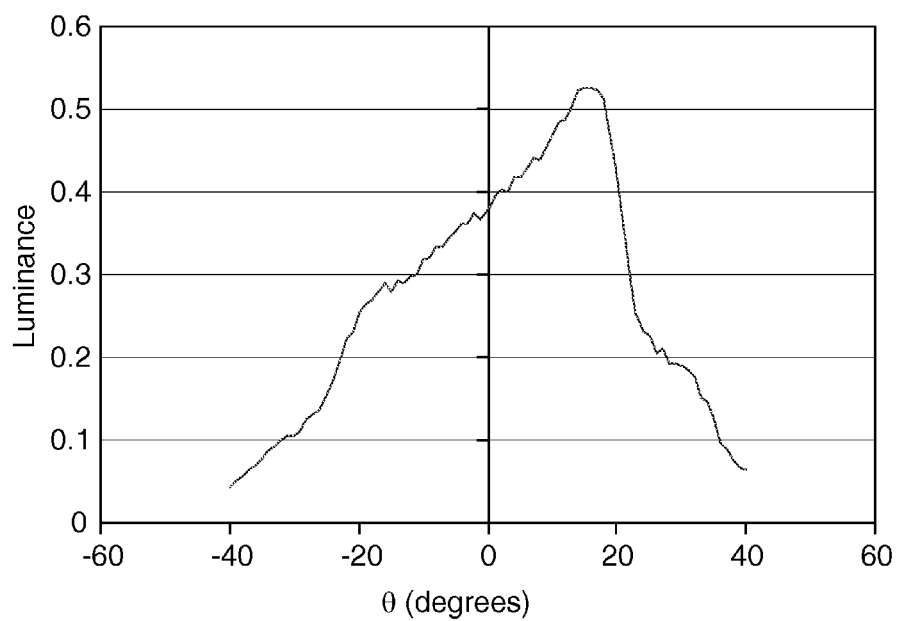
Figure 6D:
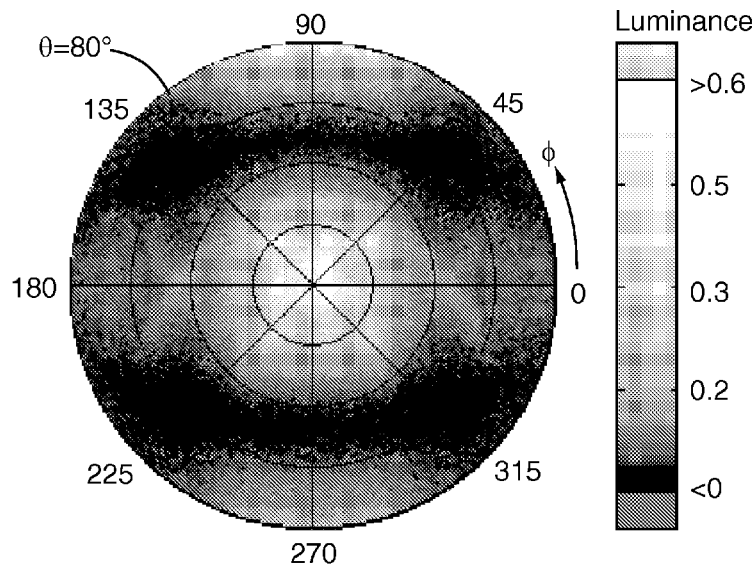
Figure 6E:
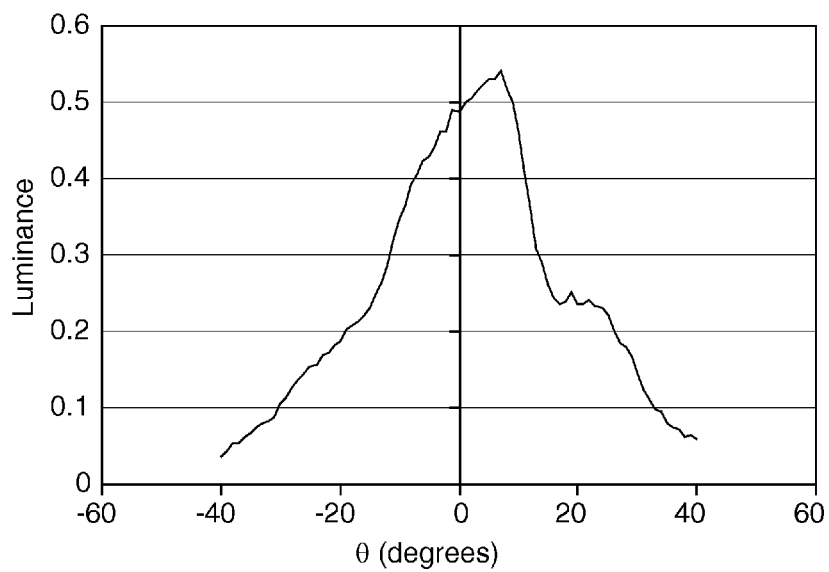
Figure 6F:
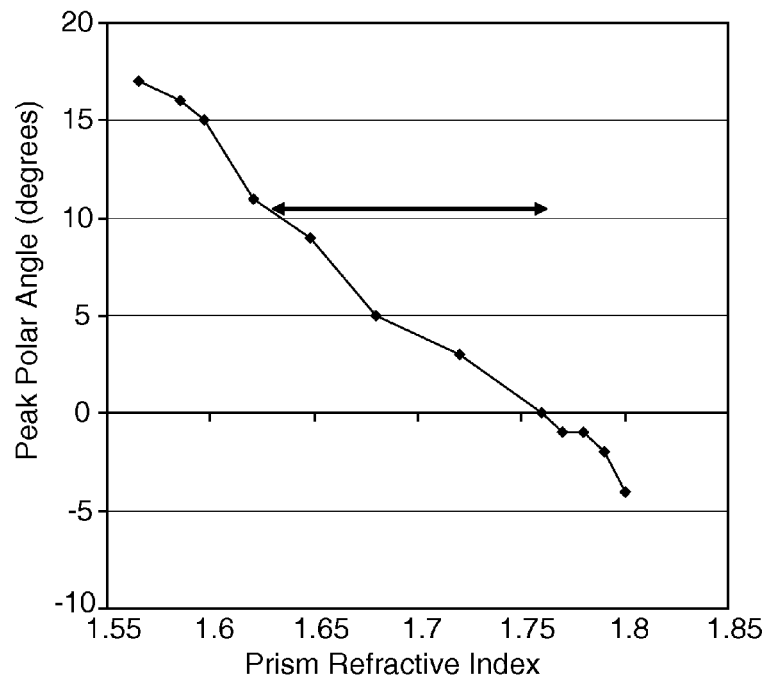
Figure 6G:
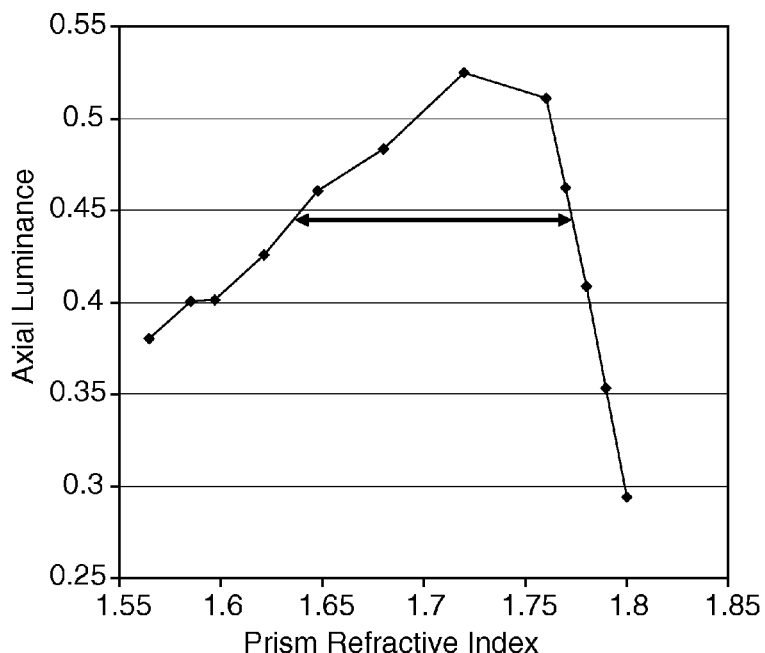

To test these results, we begin again using a different, second, modeled light guide. FIG. 6a is a grayscale conoscopic image of the computed luminance of the second modeled light guide with no other optical components. The grid overlaying the image is provided for reference purposes, just as in the previous conoscopic plots. Thus, the image of FIG. 6a depicts a light distribution analogous to, for example, the light distribution emitted from light guide 120 of FIGS. 1-3. The image confirms the highly oblique nature of the light emitted from the light guide. As mentioned above, the direction of maximum luminance for this first light guide has a polar angle of $\theta \approx 76$ degrees, and an azimuthal angle $\phi$ of about 90 degrees. The output light distribution of this second light guide is also wider in the polar and azimuthal directions compared to the first light guide.

Figure 5B:
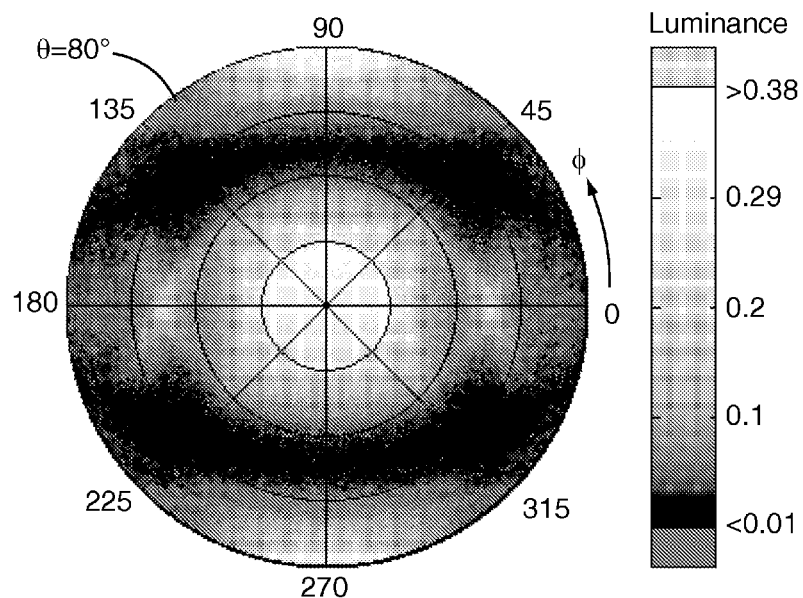
FIG. 5b is a conoscopic image similar to FIG. 5a but for a light distribution provided at the output of a first backlight that comprises the light guide associated with FIG. 5a in combination with a first set of crossed prismatic recycling films (prism refractive index=1.56), but with no diffuser film.
Figure 5C:
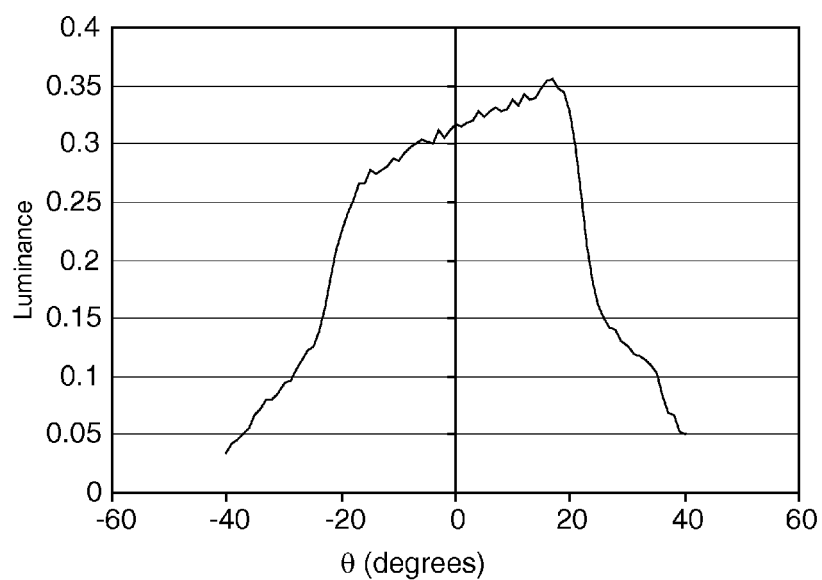
FIG. 5c is a graph of luminance vs. polar angle θ for the light distribution of FIG. 5b in a plane defined by a fixed azimuthal angle φ=90 degrees.
Figure 5D:
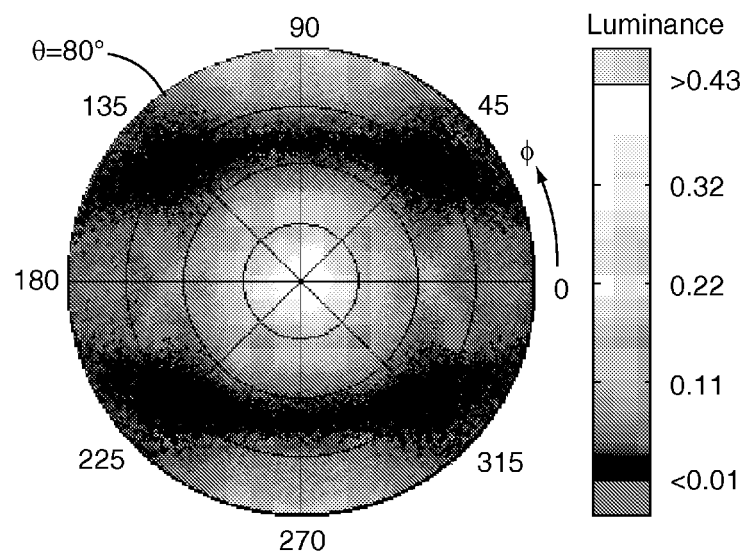
FIGS. 5d and 5e are similar to FIGS. 5b and 5c, respectively, but for a second backlight that differs from the first backlight only by changing the prism refractive index of the crossed recycling films from 1.56 to 1.68.
Figure 5E:
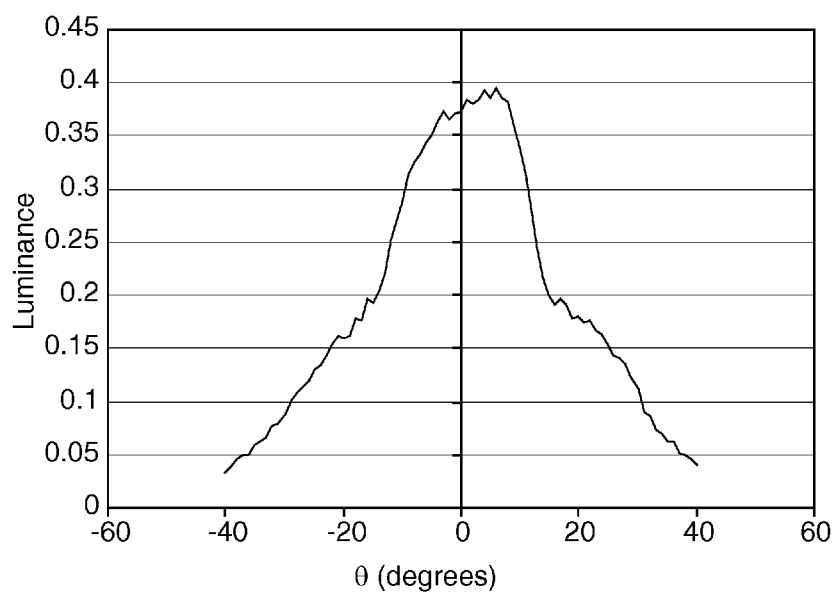
Figure 5F:
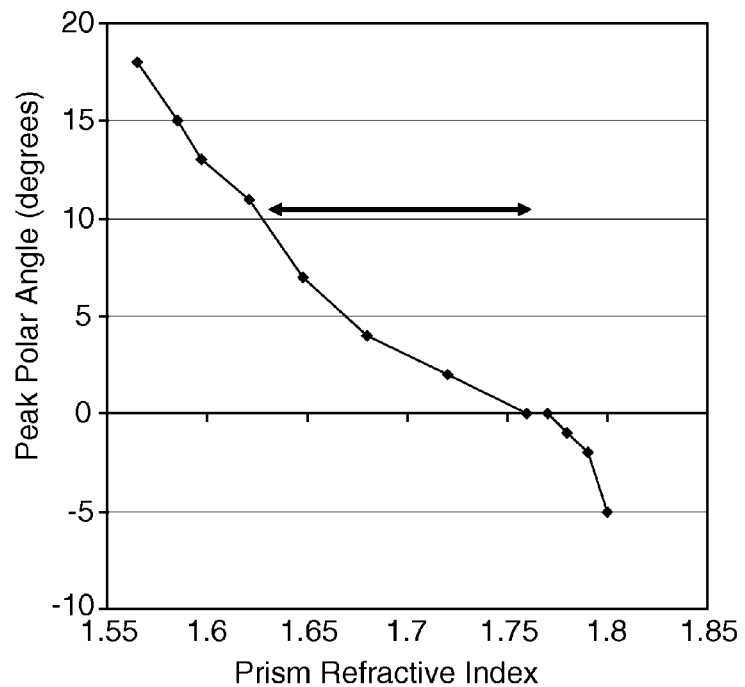
FIGS. 5f and 5g relate to characteristics of the light distribution provided by backlights such as those associated with FIGS. 5b-e but where the prism refractive index is an independent variable, with FIG. 5f plotting the polar angle θ of the direction of maximum luminance (referred to as the peak polar angle) as a function of prism refractive index, and with FIG. 5g plotting the axial luminance (luminance at θ=0) as a function of prism refractive index.
Figure 5G:
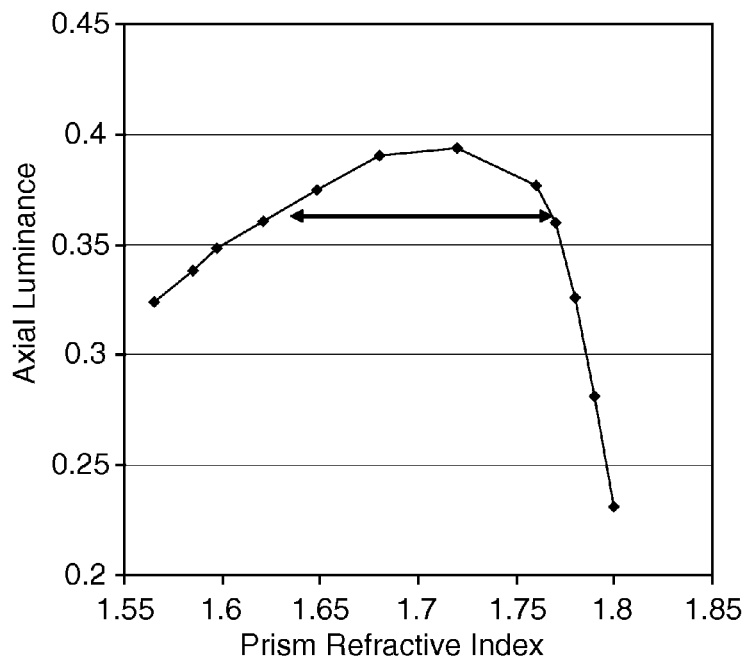

Using this second modeled light guide, we now add a pair of crossed prismatic recycling films just as we did in connection with FIG. 5b. The prisms of both films are assumed to have included angles of 90 degrees, and the prism refractive index is 1.56. We include no diffuser film between the crossed recycling films and the second light guide. We then calculate the light distribution exiting the top recycling film, and plot the result in FIG. 6b. For clarity, we also plot the luminance of the light distribution of FIG. 6b along the plane defined by $\phi=90$ degrees (scanning along the vertical direction of the conoscopic diagram), showing the result in the graph of FIG. 6c. As is evident from the plot, the luminance peak is again far from the axial direction (polar angle=0) for this backlight design.

We next replace the crossed recycling films having prism index 1.56 with an identical set of crossed recycling films, but where the prism refractive index is now set to 1.68. We again calculate the light distribution exiting the top recycling film, and plot the result in FIG. 6d. For clarity, we also plot the luminance of the light distribution of FIG. 6d along the plane defined by $\phi=90$ degrees (scanning along the vertical direction of the conoscopic diagram), showing the result in the graph of FIG. 6e. As is evident from the plot, the luminance peak is now much closer to the axial direction for this backlight design, and the maximum luminance is also brighter due to an increase in light concentration.

We next repeat this exercise using the same second light guide and the same set of crossed recycling films, but we change the prism index over a range of values and record the axial luminance (calculated luminance at $\theta=0$) and peak polar angle of the light distribution exiting the top recycling film. The results are plotted in FIGS. 6f and 6g. It is again evident that in order for the peak brightness of the backlight to be no more than 10 degrees from the axial direction ($\theta=0$), the prism refractive index should be greater than 1.63. Beyond a prism refractive index of 1.76, the maximum luminance drops considerably, and the peak brightness shifts to the opposite side of the axial direction. A bold double-arrow line is provided in both FIGS. 6f and 6g to depict the preferred refractive index range.

Unless otherwise indicated, all numbers expressing quantities, measurement of properties and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference, to the extent they are not inconsistent with the foregoing disclosure.

The invention claimed is:

1. A backlight system having an optical axis, comprising:
an extended area light guide having an output surface and a side surface;
one or more light sources disposed to emit light into the light guide through the side surface, the light guide providing a first light distribution from the output surface, the first light distribution having a maximum luminance at a first polar angle relative to the optical axis; and
a first and second prismatic recycling film, each having an input surface and an output surface, the first prismatic recycling film being disposed between the second prismatic recycling film and the light guide, the first and second recycling films being rotated azimuthally with respect to each other in a substantially crossed orientation, and the first and second prismatic recycling films providing a second light distribution from the output surface of the second recycling film;
wherein light is specularly transmitted from the output surface of the light guide to the input surface of first recycling film;
wherein the first prismatic recycling film comprises first prisms and the second prismatic recycling film comprises second prisms, the first and second prisms having refractive indices tailored to provide the second light distribution with a maximum luminance at a second polar angle relative to the optical axis, the second polar angle being no more than 10 degrees;
wherein the first polar angle is at least 60 degrees; and
wherein the first and second prisms have refractive indices at a wavelength of 550 nm in a range from 1.63 to 1.76.

2. The system of claim 1, wherein the first prisms are disposed at the output surface of the first recycling film, and the second prisms are disposed at the output surface of the second recycling film.

3. The system of claim 1, wherein the first and second prisms have refractive indices at a wavelength of 550 nm in a range from 1.65 to 1.75.

4. The system of claim 3, wherein the first and second prisms have refractive indices at a wavelength of 550 nm in a range from 1.67 to 1.73.

5. The system of claim 1, wherein the system includes no diffuser film between the output surface of the light guide and the input surface of the first recycling film.

6. The system of claim 1, wherein the output surface of the light guide is adjacent the input surface of the first recycling film.

7. The system of claim 1, wherein the output surface of the light guide contacts the input surface of the first recycling film.

8. The system of claim 1, wherein light travels only through air when propagating from the output surface of the light guide to the input surface of the first recycling film.

9. The system of claim 1, wherein the first polar angle is at least 70 degrees.

10. The system of claim 9, wherein the first polar angle is in a range from 75 to 85 degrees.

11. The system of claim 1, wherein the one or more light sources comprises a plurality of discrete light sources arranged along the side surface of the light guide.

12. The system of claim 11, wherein the first recycling film is oriented such that the first prisms extend substantially perpendicular to the side surface of the light guide.

13. The system of claim 1, wherein the second recycling film comprises a matte coating.

14. The system of claim 1, wherein the input surface of the second recycling film is non-smooth to provide light scattering.

15. The system of claim 14, wherein the input surface of the first recycling film is smooth.

16. The system of claim 1, wherein the second recycling film includes a reflective polarizer.

* * * * *